Figure 1:
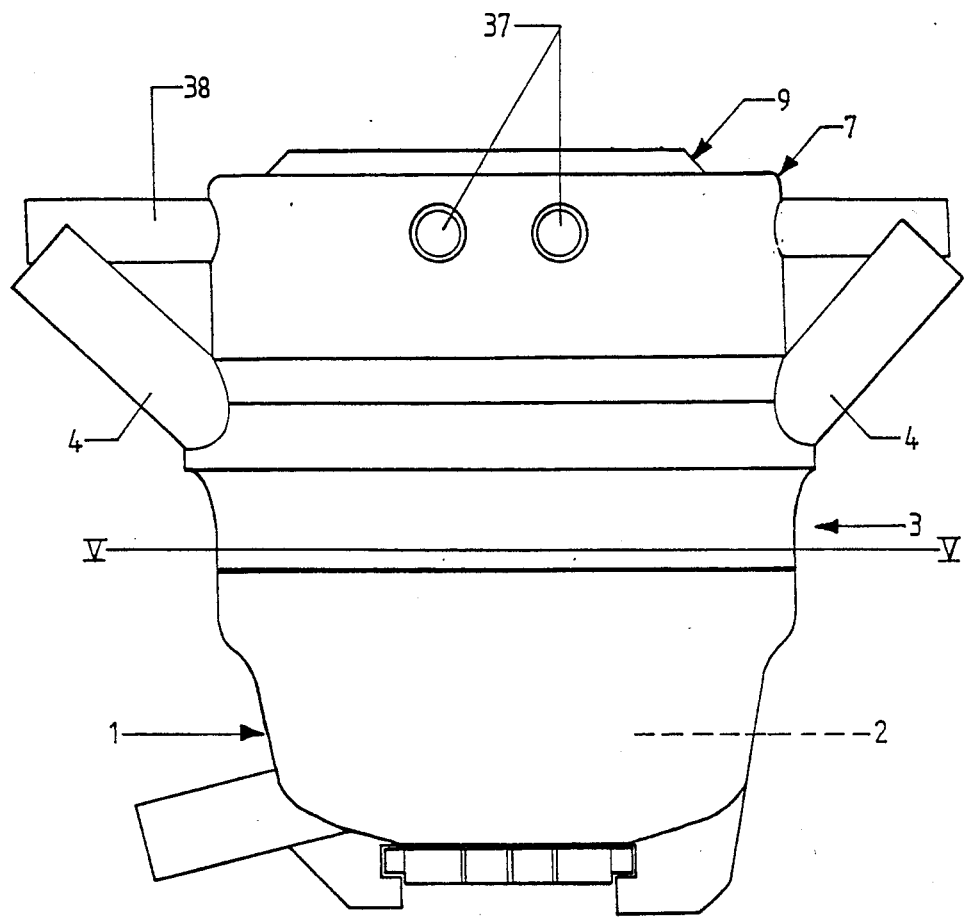

United States Patent [19]

Whittlestone et al.

[11] Patent Number: 4,671,209
[45] Date of Patent: Jun. 9, 1987

[54] TEAT CUP CLAW

[76] Inventors: Walter G. Whittlestone, 155 Riverlea Road; Claude R. Evans, 16 Clark Place, both of Hamilton, New Zealand

[21] Appl. No.: 769,663

[22] Filed: Aug. 26, 1985

[51] Int. Cl.⁴ ............................................. A01J 5/00
[52] U.S. Cl. ................................................. 49/14.55
[58] Field of Search ................ 119/14.54, 14.55, 14.37

[56] References Cited

U.S. PATENT DOCUMENTS

| 3,014,455 | 12/1961 | Olander | 119/14.54 |
| 3,810,443 | 5/1974 | Bodmin | 119/14.37 |
| 4,253,419 | 3/1981 | Yang | 119/14.54 |
| 4,395,972 | 8/1983 | Griffin | 119/14.55 |

FOREIGN PATENT DOCUMENTS 8500270 1/1985 World Int. Prop. O. ....... 119/14.54

Primary Examiner—Robert P. Swiatek
Attorney, Agent, or Firm—Dellett, Smith-Hill and Bedell

[57] ABSTRACT

A teat cup claw includes a milk inlet section with four separate compartments each of which are communicable with the interiors of a claw bowl upon which the milk inlet section is mounted. A valving member is provided for each compartment of the milk inlet section, the valving member being normally closed and adapted to open when a pressure differential across it exists. The valving members independently isolate the inlet section from the claw bowl if for any reason milking vacuum in teat cups to which the claw is connected falls. A cam ring can be provided to hold all valves open during washing cycles.

7 Claims, 5 Drawing Figures

TEAT CUP CLAW

This invention relates to teat cup claws.

Any form of vaccum in the milk collecting system of a machine milking apparatus causes a reverse air flow. A major source of air consumption is during changing of the teat cups from one cow to another and the sudden changes associated with this procedure are of such a nature that they exacerbate the rate of new infections inflicted on the cows invloved. Thus, there is a need for a means to reduce the amount of air consumed at the times of cup removal and application.

A fall in vacuum in the milk collecting system can also cause a reverse flow of potentially infected milk from the claw to the teat cups. This can arise by milk droplets being present in the reverse air flow, these milk droplets being conveyed during reverse air flow from the claw to the cups. There is also a need for a means to reduce the possibility of reverse flow of milk.

It is an object of the present invention to provide a teat cup claw which operates to substantially reduce the amount of air flowing into the machine during teat cup changing.

It is a further object of the present invention to provide a teat cup claw whereby reverse flow of potentially infected milk is prevented.

Further aspects and advantages of the present invention will become apparent from the ensuing description which is given by way of example.

According to the broadest aspect of the present invention there is provided a teat cup claw for a milking machine, said teat cup claw comprising a housing having separate milk inlet means each communicable with the milk chambers of a teat cup, a milk outlet chamber communicable with each of the separate milk inlet means, a plurality of normally biased closed captive valves adapted to seal off the milk inlet means from the milk outlet chamber but responsive to open and allow communication between the inlet means and the outlet chamber when a pressure differential across the valves exists such as when an animal is milked using the claw.

According to a further aspect of the present invention the captive valves are stem valves having a valve head sealable against the valve face between the inlet means and the outlet chambers, each of the said valves being biased into a normally closed position by a biasing spring associated with the valve stem and the housing and an override device co-operative with said valve stems or manually overriding the biasing springs so that the valve members may be held in an open position as required, for example during milking plant washing.

Figure 2:
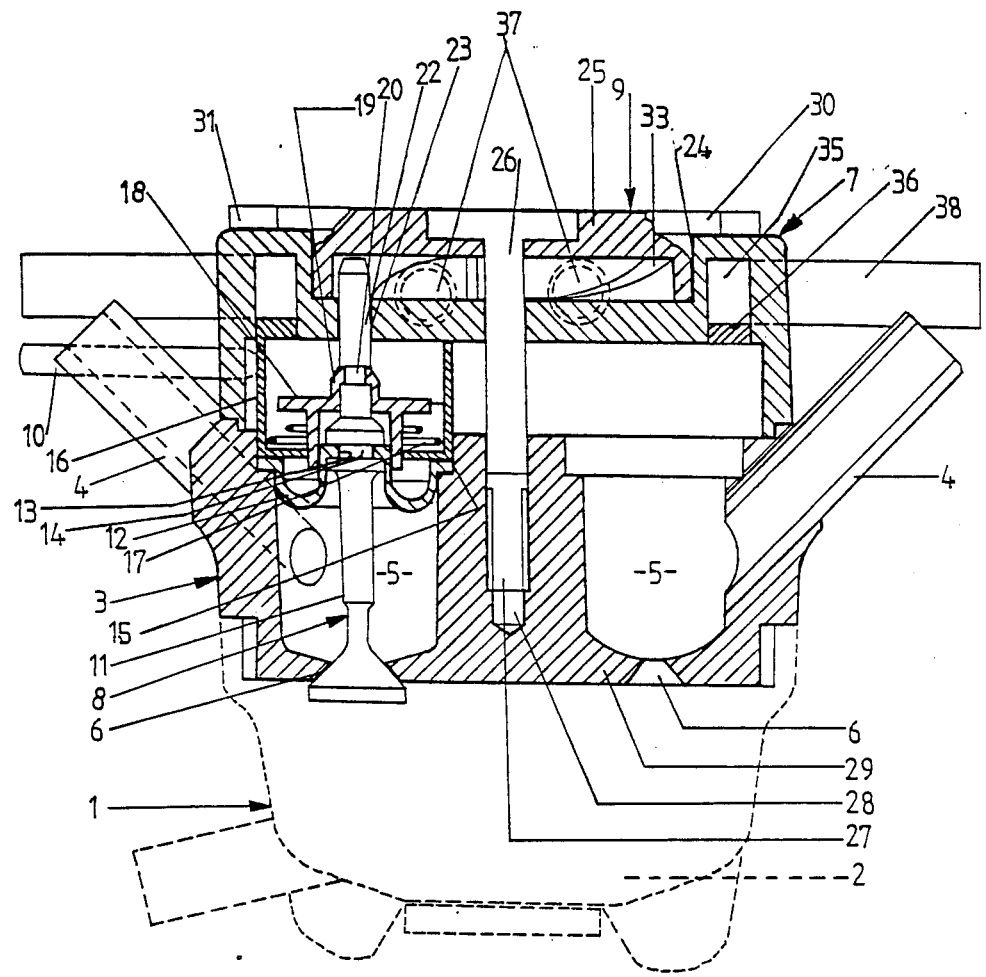
Figure 3:
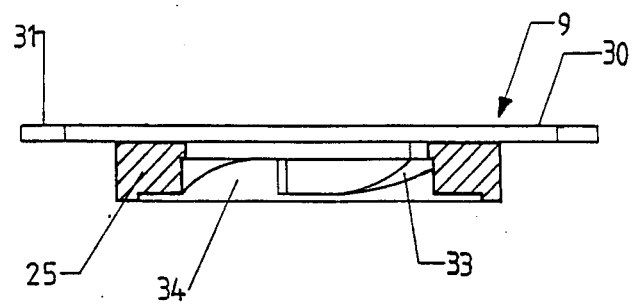
Figure 4:
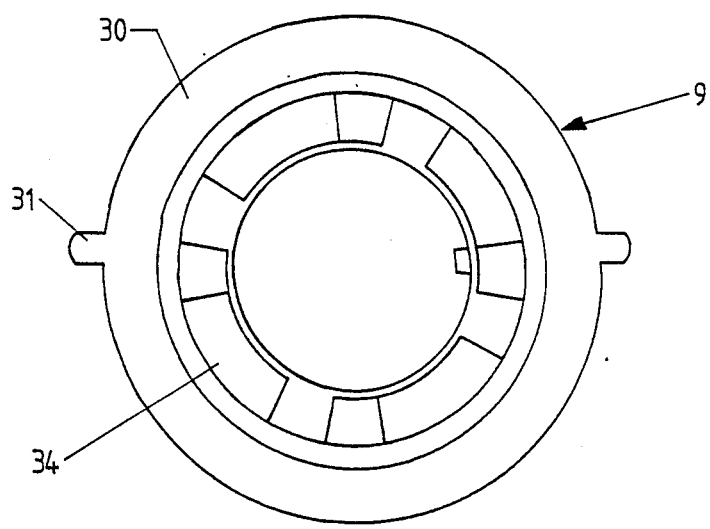
Figure 5:
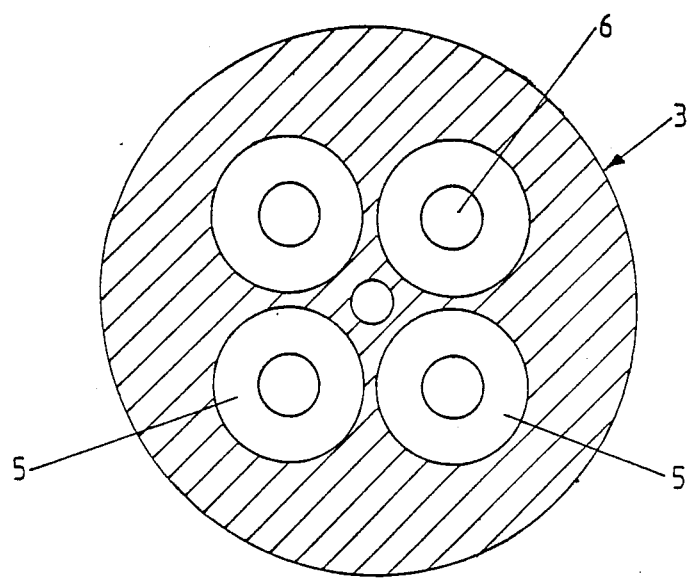

In the more detailed description of the invention which follows, reference will be made to the accompanying drawings in which:

FIG. 1 is a side view of a teat cup claw for a milking machine in accordance with the most favoured embodiment of the present invention, and FIG. 2 is a cross-section of a teat cup claw of FIG. 1 with parts of the claw removed, and FIG. 3 is a section elevational view of a cam ring arrangement of the claw shown in FIGS. 1 and 2, and FIG. 4 is an underside view of the cam ring of FIG. 3, and FIG. 5 is a cross-section at V:V of FIG. 1.

With respect to the drawings the teat cup claw illustrated has three major components. The first component is a milk claw bowl generally indicated by arrow 1. The claw bowl 1 defines a milk outlet chamber 2. The second component is a central section generally indicated by arrow 3 which mounts the claw bowl 1. Milk inlet tubes 4 each of which can be connected in the usual way to a set of teat cups (not shown) extend from the central section 3. The milk inlet tubes 4 lead into four separate inlet chambers 5 which are communicable with the milk outlet chamber 2 via openings 6. The third component is a cap for the central section 3 generally indicated by arrow 7. Each of the inlet chambers 5 accommodates a normally closed stem valve generally indicated by arrow 8 which controls the communication between the inlet chambers 5 and the outlet chamber 2. In the embodiment illustrated the cap 7 mounts a manual override device generally indicated by arrow 9 which is operable to hold open the stem valves 8 when required. A fixture 10 is provided for an anchorage of a tether of the type commonly used to couple milking claws to the pneumatic ram of an automatic cluster remover or to locate the claw during milking plant washing or between milkings.

As aforesaid the central section 3 has four inlet chambers 5 into each of which opens the milk inlet tubes 4 at a tangentially inclined angle. The stem valves 8 are positioned within each chamber and each valve seats on openings 6 formed in the base of the central section 3. Each valve 8 is carried by a valve stem 11 which is coupled to a diaphragm 12 by an opening 13 therein fitting within a groove 14 of the valve stem 11.

The peripheral edge 15 of the diaphragm 12 is located on the upper edge of the chamber wall to be sandwiched between the upper edge and a cup shaped housing 16. Located within the housing 16 is a spring 17 held in place by a keeper 18 mounted on the stem 11. The keeper 18 has a flanged upper portion 19 which fits into a peripheral groove 20 on the valve stem 11 and thereby fixes the keeper 18 into position.

In order to simplify the opening of the valves 5 manually, and to make it possible to open all valves simultaneously during cleaning operations the cam ring override device generally indicated by arrow 9 is incorporated into the cap 7 of the claw. The upper end 22 of each valve stem 11 is located within an aperture 23 in a central portion of the cap 7 to project into a cavity 24 in which the cam ring 9 is located. The cam ring 9 consists of a body 25 which is rotatably mounted by a central shaft 26 having a threaded lower part 27 engaged in a threaded opening 28 in a hub 29 of the central section 3. A peripheral rim 30 projects from the body 25 to engage on the upper surface of the cap 7 and surrounds the cavity 24 in which the cam ring 9 is located. Lugs 31 project from the edge of the rim 30 and are provided to enable a user of the claw to rotate the cam ring 9.

An interior portion 33 of body 25 includes four cam surfaces 34 each of which engages with the upper end 22 of a respective valve stem 11. When the cam ring 9 is rotated by the lugs 31 the cam surfaces 34 push the valve stems 11 downwardly to simultaneously move the valve members 8 from the seatings around openings 6. Accordingly, when washing of the claw is to take place the cam ring 9 can be rotated to open the valves 8 and thereby permit washing fluid to flow through the claw. The inclusion of the cam ring 9 makes it possible to clean the claw and components of associated milking plant by flushing from a bucket or by using the reverse flow method.

The cap 7 incorporates a pulsation air chamber 35 which surround the cavity 24. The pulsation air chamber is isolated from the inlet chambers 5 and can be formed in the cap by cutting a peripheral groove therein and then sealing off the opening to the groove with a sealing strip 36. Two pulsation air inlet tubes 37 into the pulsation air chamber can be provided and four pulsation outlet tubes 38 (one for each pulsation chamber in a set of teat cups) can provide normal alternating pulsation. In a situation where simultaneous pulsation is required a single pulsation inlet tube 37 connects the four pulsation outlet tubes 38 via the pulsation chamber 35.

The claw can be moulded or fabricated in plastics, metal, or stainless steel. With the claw construction according to the invention the substantial reduction in the air flow requirements during cup changing decreases the reserve air requirements of the milking machine when the claw is in use. This can lead to a reduction in the size of vacuum regulator required and there are thus consequential decreases in the size of the vacuum pump which greatly reduces the power requirements of the milking machine. The claw described stablises milking system vacuum, thus refducing one of the major causes of infection in milking machines.

The invention is open to modification and development within the broad scope of the invention as stated herein.

We claim:

1. A teat cup claw for a milking machine, said teat cup claw comprising a housing having separate milk inlet means each communicable with the milk chambers of a teat cup, a milk outlet chamber communicable with each of the separate milk inlet means, a plurality of normally biased closed captive valves adapted to seal off the milk inlet means from the milk outlet chamber but responsive to open and allow communication between the inlet means and the outlet chamber when a pressure differential across the valve exists such as when an animal is milked using the claw.

2. A teat cup claw as claimed in claim 1 wherein the housing comprises three co-operative sections, a first section being a claw bowl, a second section releasably connectable to the claw bowl which houses the individual valve members and a third section which incorporates the override device which is mounted to said second section.

3. A teat cup claw as claimed in claim 2 wherein the override device is a rotatable member rotatable with respect to the third section of the claw, said rotatable member having cams contactable with said free ends of the valve stems on rotation thereof.

4. A teat cup claw as claimed in claim 2 wherein the third section of the claw incorporates a pulsation air inlet and a series of outlets connectable to the pulsation chambers of a set of teat cups.

5. A teat cup claw as claimed in claim 2 wherein the stem of each vlave mounts a diaphragm sealing off the second section with respect to the third section.

6. A teat cup claw for a milking machine, said teat cup claw comprising a housing having separate milk inlet means each communicable with the milk chambers of a teat cup, a milk outlet chamber communicable with each of the separate milk inlet means, a plurality of normally biased closed captive valves adapted to seal off the milk inlet means from the milk outlet chamber but responsive to open and allow communication between the inlet means and the outlet chamber when a pressure differential across the valve exists such as when an animal is milked using the claw, wherein the captive valves are stem valves having valve stems and a valve head sealable against a valve face between the inlet means and outlet chambers, each of said valves being biased into a normally closed position by a biasing spring associated with the valve stem and the housing and an override device co-operative with said valve stems for manually overriding the biasing springs so that the valve members may be held in an open position as required.

7. A teat cup claw as claimed in claim 6 wherein each inlet means includes a inlet chamber in which the valve members are disposed and free ends of the valve stems of said valve members extend beyond the housing where they are in contact with the override device.

* * * * *